(12) United States Patent
Mueller et al.

(10) Patent No.: US 12,503,798 B2
(45) Date of Patent: Dec. 23, 2025

(54) SPACER FABRIC AND USE

(71) Applicant: Mueller Textil GmbH, Wiehl-Drabenderhoehe (DE)

(72) Inventors: Stefan Mueller, Wiehl (DE); Heide Goeckel, Wiehl (DE)

(73) Assignee: Mueller Textil GmbH, Wiehl-Drabenderhoehe (DE)

( * ) Notice: Subject to any disclaimer, the term of this patent is extended or adjusted under 35 U.S.C. 154(b) by 0 days.

(21) Appl. No.: 18/682,158

(22) PCT Filed: Aug. 22, 2022

(86) PCT No.: PCT/EP2022/073290
§ 371 (c)(1),
(2) Date: Feb. 8, 2024

(87) PCT Pub. No.: WO2023/036590
PCT Pub. Date: Mar. 16, 2023

(65) Prior Publication Data
US 2024/0376647 A1    Nov. 14, 2024

(30) Foreign Application Priority Data

Sep. 13, 2021  (DE) .................... 10 2021 123 643.6

(51) Int. Cl.
*D04B 21/06*    (2006.01)
*D04B 21/16*    (2006.01)

(52) U.S. Cl.
CPC ............ *D04B 21/06* (2013.01); *D04B 21/16* (2013.01); *D10B 2331/04* (2013.01);
(Continued)

(58) Field of Classification Search
None
See application file for complete search history.

(56) References Cited

U.S. PATENT DOCUMENTS 3,084,529 A * 4/1963 Scheibe ................ D04B 27/32
                                                        66/193
5,385,036 A * 1/1995 Spillane ................ A43B 1/04
                                                        66/196
(Continued)

FOREIGN PATENT DOCUMENTS

DE    10 2010 010 524 A1    9/2011
DE    10 2010 010 524 B4    11/2013
(Continued)

OTHER PUBLICATIONS

"Yarn Conversion Calculator." Service Thread. Feb. 20, 2025. (Year: 2025).*
(Continued)

*Primary Examiner* — Grace Huang
(74) *Attorney, Agent, or Firm* — Collard & Roe, P.C.

(57) ABSTRACT

A spacer fabric has a first planar warp-knitted fabric layer, a second planar warp-knitted fabric layer, and spacer threads separating the warp-knitted fabric layers, wherein the first warp-knitted fabric layer is formed from at least a first and a second thread system and has stitch wales that run in the production direction, as well as stitch courses that run in the crosswise direction. The first thread system is formed as a pillar stitch construction, and the threads of the second thread system are guided, without forming loops, along the production direction, in an alternating sequence, offset and alternately over at least two adjacent stitch wales. The threads of the first thread-system have a greater fineness than the spacer threads.

11 Claims, 3 Drawing Sheets

(52) U.S. Cl.
CPC .... *D10B 2401/00* (2013.01); *D10B 2403/021* (2013.01); *D10B 2505/08* (2013.01); *D10B 2505/12* (2013.01)

(56) References Cited

U.S. PATENT DOCUMENTS

| | | | |
|---|---|---|---|
| 7,213,421 B2 | 5/2007 | Shirasaki et al. | |
| 7,347,245 B2 * | 3/2008 | Graichen | D04B 19/00 |
| | | | 160/84.04 |
| 8,286,451 B2 | 10/2012 | Mueller et al. | |
| 9,839,504 B2 * | 12/2017 | Miller | A61F 2/0045 |
| 10,118,323 B2 * | 11/2018 | Fujita | B29C 44/16 |
| 11,938,003 B2 * | 3/2024 | Cohade | D04B 21/18 |
| 2003/0106346 A1 * | 6/2003 | Matsumoto | D04B 21/10 |
| | | | 66/195 |
| 2011/0224703 A1 * | 9/2011 | Mortarino | A61F 2/12 |
| | | | 606/151 |
| 2013/0172915 A1 * | 7/2013 | Thomas | A61F 2/0063 |
| | | | 606/151 |
| 2014/0000319 A1 | 1/2014 | Mueller et al. | |
| 2017/0067213 A1 * | 3/2017 | Sarris | D04B 21/16 |
| 2020/0340152 A1 | 10/2020 | Mueller et al. | |
| 2021/0161645 A1 * | 6/2021 | Rocco | D04C 1/06 |
| 2022/0258450 A1 * | 8/2022 | Lawrence | D04B 21/08 |

FOREIGN PATENT DOCUMENTS

| | | | | |
|---|---|---|---|---|
| DE | 10 2012 105 134 A1 | 12/2013 | | |
| EP | 1 344 856 A1 | 9/2003 | | |
| EP | 2 853 232 A1 | 4/2015 | | |
| JP | 2003013346 A | * | 1/2003 | D04B 21/16 |
| KR | 20060061893 A | * | 6/2006 | D04B 21/08 |

OTHER PUBLICATIONS

International Search Report in PCT/EP2022/073290, mailed Nov. 22, 2022.
Written Opinion of the International Searching Authority in PCT/EP2022/073290, mailed Nov. 22, 2022, with English translation.
VDA—Test specification sheet: Upholstery Fabric—Hook and loop fastener test, Dec. 2008 (8 pages) (with English translation).
Hanser: Gries et al. "Textile Fertigungsverfahren", 2019 (5 pages) (with English translation of sections 13.4.1. and 13.4.1.1).

* cited by examiner

SPACER FABRIC AND USE

CROSS REFERENCE TO RELATED APPLICATIONS

This application is the National Stage of PCT/EP2022/073290 filed on Aug. 22, 2022, which claims priority under 35 U.S.C. § 119 of German Application No. 10 2021 123 643.6 filed on Sep. 13, 2021, the disclosure of which is incorporated by reference. The international application under PCT article 21 (2) was not published in English.

BACKGROUND OF THE INVENTION

The invention relates to a spacer fabric having a first planar warp-knitted fabric layer, a second planar warp-knitted fabric layer, and spacer threads connecting the warp-knitted fabric layers, wherein the first warp-knitted fabric layer is formed from at least a first and a second thread system and has stitch wales that run in the production direction, as well as stitch courses that run in the crosswise direction.

Spacer fabrics are characterized, on the one hand, by a light, air-permeable structure, and, on the other hand, by an elastic behavior in the thickness direction, due to the spacer threads that run between the two planar warp-knitted fabric layers. On the basis of these properties, spacer fabrics can be provided as soft, elastic layers that make air circulation possible, for example in the case of mattresses, upholstered furniture, articles of clothing or shoes. Furthermore, spacer fabrics are also in widespread use as technical textiles, also in the automotive sector, so as to be used as an elastic intermediate layer in climate-controlled seats, seat covers or interior trim parts.

A spacer fabric as an intermediate layer for the formation of an interior trim of a motor vehicle is known from DE 10 2010 010 524 B4, wherein in concrete terms, a reduced tear resistance is made available for the use of the spacer fabric over an airbag and/or an airbag flap, at multiple locations.

Furthermore, it is increasingly of interest, particularly in the sector of the automotive industry, to use the spacer fabric not only as an intermediate layer, but rather also directly as a decorative layer. Thus, for example, DE 10 2012 105 134 A1 describes a spacer fabric that directly forms a surface of an interior trim part and/or of a seat cover. In order to achieve great strength, in this regard, the spacer threads in a first warp-knitted fabric layer form loops by means of thread inter-looping, while the spacer threads in the second planar warp-knitted fabric layer do not form loops and are merely incorporated there as a type of weft. In addition, a perforated structure of the second warp-knitted fabric layer can be provided, which is then covered, in a practical manner, by weft threads on the inner side of the second warp-knitted fabric layer. Such a perforated structure is usually achieved by way of a filet lapping, so that usually, individual holes, which are relatively large and clearly visible, result from a plurality of loops.

In the case of the known spacer fabrics, however, there is the risk, when using them as a decorative layer, that individual threads can be pulled out under mechanical stress, and therefore the spacer fabric is optically and functionally impaired. This risk particularly exists if the spacer fabric is exposed to sharp objects or also to hook-and-loop closures, such as those that are frequently used in the case of articles of clothing.

In order to test the resistance of textiles to hook-and-loop closures, they are subjected, in practice, to what are called hook-and-loop closure tests, with which their sensitivity to friction wear stresses caused by hook-and-loop closures are tested using a method that comes close to practical conditions. The Verband der Automobilindustrie e.V. [Association of the Automotive Industry, registered association] (VDA) has issued the testing standard VDA 230-210 dated December 2008 for this purpose. After stress is put on the tested sample by means of a hook tape, evaluation takes place by means of a visual inspection, wherein an evaluation takes place in five grade levels. If only slight changes in the surface take place, the grade of 5 is awarded, whereas if complete destruction of the surface and of the structure takes place, the grade of 1 is assigned. In order to be suitable for long-term use in a motor vehicle, at least the grade of 4 is aimed at according to the aforementioned test specification, something that cannot easily be achieved with known spacer fabrics, for which reason the vehicle seats are usually always provided with an additional cover layer, for example one made of fabric, leather or imitation leather.

The aforementioned document DE 10 2012 105 134 A1 has already fundamentally proven itself with regard to the hook-and-loop closure resistance. However, because of its relatively large perforated structure, it can be flexibly used for interior trim only to a limited degree.

SUMMARY OF THE INVENTION

Against this background, the present invention is based on the task of indicating a cost-advantageous and easily produced spacer textile, which has great wear resistance, on the one hand, and for another thing can be flexibly used for different types of interior trim.

This task is accomplished by means of a spacer fabric in accordance with claim 1. Accordingly, it is provided that the first thread system is formed as a pillar stitch construction, and the threads of the second thread system are guided, without forming loops, along the production direction, in an alternating sequence, offset and alternately over at least two adjacent stitch wales, and wherein the threads of the first thread system have a greater fineness than the spacer threads.

According to such an embodiment, the perforated structure of the first warp-knitted fabric layer is not achieved by way of a filet lapping. Instead, the first warp-knitted fabric layer is formed essentially by way of a traditional pillar stitch construction, wherein the threads run along a stitch wale, in each instance. In order to nevertheless obtain a certain formation of holes, a second thread system is then provided, which is guided as a type of weft thread, without forming loops, alternately over at least two adjacent stitch wales. The formation of holes is achieved, in this regard, in that the threads of the second thread system are offset in an alternating sequence. This means that the threads, proceeding from a central stitch wale, are alternately guided over the adjacent left stitch wale and over the adjacent right stitch wale, and as a result, they pull the first thread system out of shape to a certain degree. Proceeding from three adjacent stitch wales, this results in a sequence of 3-2-3-1-2-1, wherein the central stitch wale is indicated with the No. 2 in that sequence. As the result of using a pillar stitch construction, in the first thread system the threads in every stitch course are fixed in place, to a certain extent, by way of a loop, so that even when acted on by the hooks of a hook-and-loop closure, the threads of the first thread system cannot be easily pulled out.

A further contribution to the hook-and-loop closure resistance comes from the fact that the threads of the first thread system have a greater fineness than the spacer threads, so that the first thread system can cover the spacer threads to a certain extent, and the spacer threads therefore cannot be easily seized by the hooks of the hook-and-loop closure that act on them.

In this connection, the fineness of textile threads refers to a measure of their weight relative to their length. The fineness of fibers is generally also referred to as titer (cf. "Textile Fertigungsverfahren—Eine Einführung" ["Textile Production Methods—An Introduction"], Gries et al., p. 411, $3^{rd}$ edition). Threads having a greater fineness or titer have a greater weight and usually also thickness than threads having a lesser fineness. By means of the greater thickness of the threads of the first thread system, it is thereby ensured that these have a certain planar expanse in regions outside of the perforated structure, so that the hooks of the hook-and-loop closure can penetrate into the surface of the first warp-knitted fabric layer only to a limited degree.

In total, therefore, two separate systems must be considered, independently of one another, for the hook-and-loop closure resistance. On the one hand, the first warp-knitted fabric layer itself is supposed to have a certain hook-and-loop closure resistance, so that individual threads, in particular of the first thread system, cannot be easily pulled out, so as to have a disadvantageous influence on the optical appearance. This result is achieved by means of the pillar stitch construction of the first thread system. In this connection, it is also practical if the threads of the first thread system are formed from a material that only puffs out slightly or not at all, in particular a multifilament yarn, and therefore do not have any excess volume or only a slight excess volume, which can be pulled out under the effect of hook-and-loop closure hooks.

For another thing, however, the penetration of hook-and-loop closure hooks into the spacer fabric and the capture of spacer threads should also be prevented, since this could lead to local compression of the spacer fabric, which would also be disadvantageous from an optical point of view but also, at the same time, a functional point of view. This result is achieved, in particular, by means of the relatively small and finely textured perforated structure, which furthermore also allows easier structural adaptation to different purposes of use as interior trim.

According to a preferred further development of the invention, the ratio of the fineness of the threads of the first thread system to the spacer threads amounts to at least 1.5:1, particularly preferably 2:1, very particularly preferably at least 3:1. The fineness of the individual threads is generally indicated, in this regard, with the unit dtex, wherein the threads of the first thread system preferably have a fineness between 100 and 300 dtex, preferably between 150 and 200 dtex.

According to a preferred further development of the invention, the threads of the first thread system also have a greater fineness than the threads of the second thread system, wherein the ratio preferably amounts to at least 2:1, preferably at least 3:1, and very particularly preferably at least 4:1. According to such an embodiment, it is ensured that the threads of the second thread system are also protected, to a certain extent, by the threads of the first thread system, from being pulled out by means of hook-and-loop closure hooks that act on them. Since the threads of the second thread system, on the basis of their offset arrangement, are decisive for the formation of the perforated structure, pulling out individual threads would have the result that the perforated structure could not be maintained over the entire surface of the first warp-knitted fabric layer. This would decisively worsen the optical appearance, in particular, particularly because due to the homogeneous structure of the spacer fabric, individual damaged areas are easily visible to the user or consumer from the outside, and can be perceived as particularly bothersome.

Preferably the fineness of the threads of the second thread system amounts to between 15 and 100 dtex, preferably between 20 and 60 dtex. Fundamentally, different types of yarns can be used as threads both for the first and for the second thread system, wherein preferably the threads of the first thread system are formed from a multifilament yarn, and the threads of the second thread system are formed from a monofilament yarn. By means of the use of a multifilament yarn for the pillar stitch construction in the first warp-knitted fabric layer, a particularly fluffy and soft surface is created. Furthermore, multifilament yarns are characterized by low bending resistance, so that the loop formation can take place without noteworthy reset forces. In contrast to this, a multifilament yarn is not necessary for the threads of the second thread system, since they do not contribute or contribute only insignificantly to the texturing of the surface of the first warp-knitted fabric layer. Furthermore, monofilaments are also characterized by a comparatively great bending resistance, so that in this way, in a simple manner, the perforated structure already explained above can be formed by means of pulling together the individual loops of the first thread system.

According to a preferred further development of the invention, the first thread system is formed with one guide bar, and the second thread system is formed with two guide bars, one of the guide bars of the second thread system being formed with intake 1 full, 1 empty.

Fundamentally, a sufficiently great hook-and-loop closure resistance can already be achieved by means of the use of the first and of the second thread system in the first warp-knitted fabric layer, wherein, however, according to a particularly preferred embodiment, in addition a third thread system is provided in the first warp-knitted fabric layer, which system is formed as an offset tricot lapping. In the case of a tricot lapping, the threads are guided, alternately offset, over two adjacent stitch wales, wherein in every stitch course, a loop formation takes place. This therefore distinguishes the third thread system significantly from the second thread system, in which the threads are merely guided as weft threads, without loop formation, in the stitch courses, in the production direction. In agreement with the second thread system, however, there is also an offset arrangement present here, so that accordingly, the threads of the third thread system are guided in an alternating sequence, alternately offset, over at least two stitch wales that are adjacent to one another. Preferably, the threads of the third thread system form loops there, where the threads of the second thread system are merely guided around the stitch wale. Essentially, therefore, a simultaneous progression of the threads of the second and of the third thread system occurs, in the production direction P, wherein the two thread systems merely differ in terms of the presence of loop formation or the absence of loop formation. By means of the loop formation of the third thread system, the threads are fixed in place and therefore cannot easily be pulled out of the first warp-knitted fabric layer. As a result, they serve as a kind of covering for the second thread system, the threads of which can be pulled out significantly more easily, due to their configuration without a loop formation, than the threads of the third thread system. By means of the covering, the result can now be achieved that in the event of penetration of the hook-and-loop closure hooks, both the threads of the second and also those of the third thread system would be grasped simultaneously, wherein then the threads of the third thread system, due to the lack of a volume excess, fix in place not only themselves but also the threads of the second thread system in the warp-knitted fabric layer.

Furthermore, by means of the inclusion of a third thread system having an offset tricot binding, the perforated structure can be closed off, to a certain degree, to prevent the penetration of dust or dirt.

Preferably, the third thread system is formed with two guide bars having an intake 1 full, 1 empty. Furthermore, the threads of the third thread system are preferably a smooth yarn. A smooth yarn is understood to be a yarn that is essentially configured to be non-crimped. As a result, it cannot be stretched in terms of its length, or can be stretched only insignificantly, and accordingly has no volume excess or only a slight volume excess between the individual loops.

According to a preferred embodiment, the warp-knitted fabric layers and/or the spacer threads consist of polyester, in particular of polyethylene terephthalate (PET).

The multi-filament yarns of the first thread system furthermore preferably have between 24 and 96 filaments. Suitable multi-filament yarns can have between 30 and 80 filaments, for example. While the material becomes even softer with an increasing number of filaments, the compression hardness as well as the resistance of the multi-filament yarn to mechanical impairments increase with a decreasing number of filaments.

In order to achieve a particularly appealing and preferably uniform color impression in the case of the textile structure of the warp-knitted fabric layers and the spacer threads, at least the multi-filament yarns of the first textile layer, as well as of the spacer threads, and preferably also of the second textile layer, are dyed not just with the same color tone but also in the same manner. In this regard, an embodiment in which the multi-filament yarns are spun-dyed is particularly preferred.

In the case of spun-dyed multi-filament yarn, the dye is added directly during the production of the individual filaments of the polymer mass, in the form of a master batch. The individual filaments are then dyed through, completely and uniformly. Even in the event of mechanical damage, such as friction wear or the like, at most the surface consistency but not the color tone will change. Spun-dyed materials are therefore particularly colorfast, even in the long term, wherein the dyes in the polymer matrix are also protected against environmental influences, such as bleaching, for example.

Aside from spun-dyed multi-filament yarn, however, other methods are not fundamentally excluded within the scope of the invention.

The spacer fabric according to the invention is characterized by great resistance to mechanical stresses. According to a preferred embodiment of the invention, the spacer fabric is characterized by a hook-and-loop closure resistance of at least Grade 4 according to the hook-and-loop closure test in accordance with VDA 230-210, if the exposed surface of the first warp-knitted fabric layer is subjected to such a test. Preferably, Grade 5 is achieved.

The spacer fabric according to the invention can also be used, on the basis of its strength, as a textile cover layer in areas exposed to great stress. Furthermore, however, it also has the elastic reset properties that are typical in the case of a spacer fabric, as well as a light, open, and breathable structure. For the application cases described, the total thickness can amount to between 2.5 mm and 8 mm, for example, wherein the present invention is not, however, restricted to this preferred range.

An interior fitting, for example a motor vehicle seat or a motor vehicle interior trim, having the described spacer fabric as a cover material or as a decorative layer, is also an object of the invention. Further modification possibilities are, for example, the seats or the interior trim of aircraft or rail vehicles, such as trains, subways or the like. Specifically in the case of airplanes, there is an effort to use seats that are as light and space-saving as possible, so as to reduce the flying weight, on the one hand, and to be able to make sufficient room for the greatest possible number of passengers, on the other hand. Furthermore, the interior fitting can also be a piece of furniture, for example furniture for seating.

The first warp-knitted fabric layer then forms the surface of the interior fitting, in other words, in particular, of the motor vehicle seat or of the motor vehicle trim. Due to the increased strength, hook-and-loop closures or other rough or sharp-edged objects cannot damage the surface of the interior fitting, or at least can damage it less easily.

The spacer fabric according to the invention therefore represents a further function, by means of the resistant surface, wherein the further advantages, namely the elastic reset properties and the breathability, are maintained. In particular, within the scope of the invention, the strength, the elastic properties, as well as the air permeability can be adapted and optimized in accordance with the requirements, in each instance.

BRIEF DESCRIPTION OF THE DRAWINGS

In the following, the invention will be explained in greater detail using an exemplary embodiment. The figures show.

DETAILED DESCRIPTION OF THE EMBODIMENTS

Figure 1:
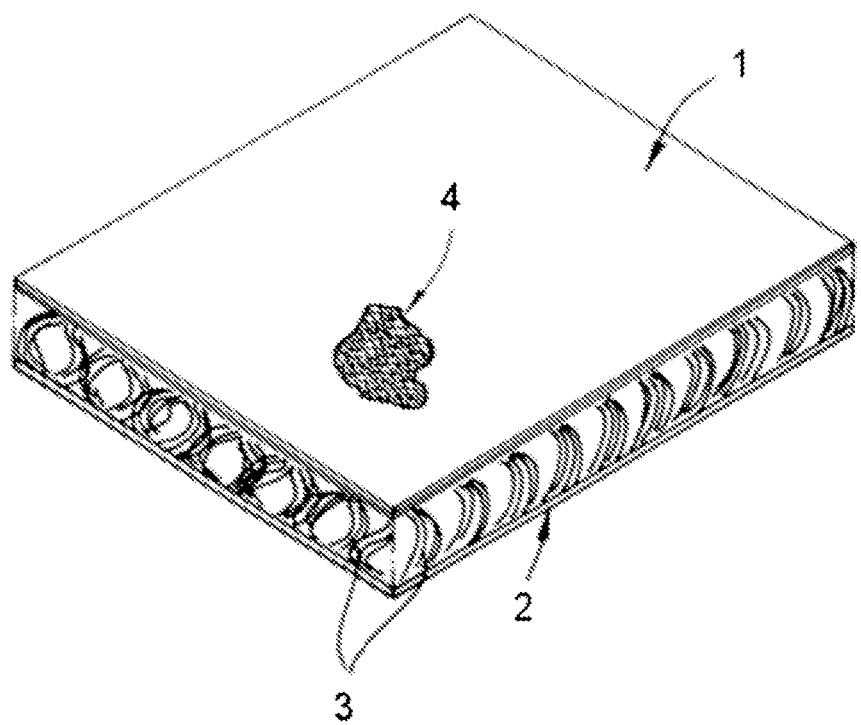
FIG. 1 a schematic view of the spacer fabric according to the invention.

FIG. 1 shows a schematic view of a spacer fabric having a first planar warp-knitted fabric layer 1 and a second planar warp-knitted fabric layer 2, which layers are connected with one another by means of spacer threads 3. It can also already be easily seen in FIG. 1 that the first planar warp-knitted fabric layer 1 has a perforated structure having openings 4. This perforated structure 4 is not produced by way of a filet lapping, in contrast to the spacer fabrics known from the state of the art, but rather, instead, by way of a traditional pillar stitch construction, wherein the embodiment of the first planar warp-knitted fabric layer 1 is shown in greater detail in FIG. 2.

Accordingly, the first warp-knitted fabric layer 1 consists of a first thread system 5 and a second thread system 6, and furthermore has stitch wales M that run in the production direction P and stitch courses R that run in the crosswise direction.

According to the invention, it is now provided that the first thread system 5 is formed as a pillar stitch construction, and the threads of the second thread system 6 are guided, without forming loops, along the production direction P, in an alternating sequence, offset and alternately over at least two adjacent stitch wales M, and wherein the threads of the first thread system 5 have a greater fineness than the spacer threads 3.

Figure 2:
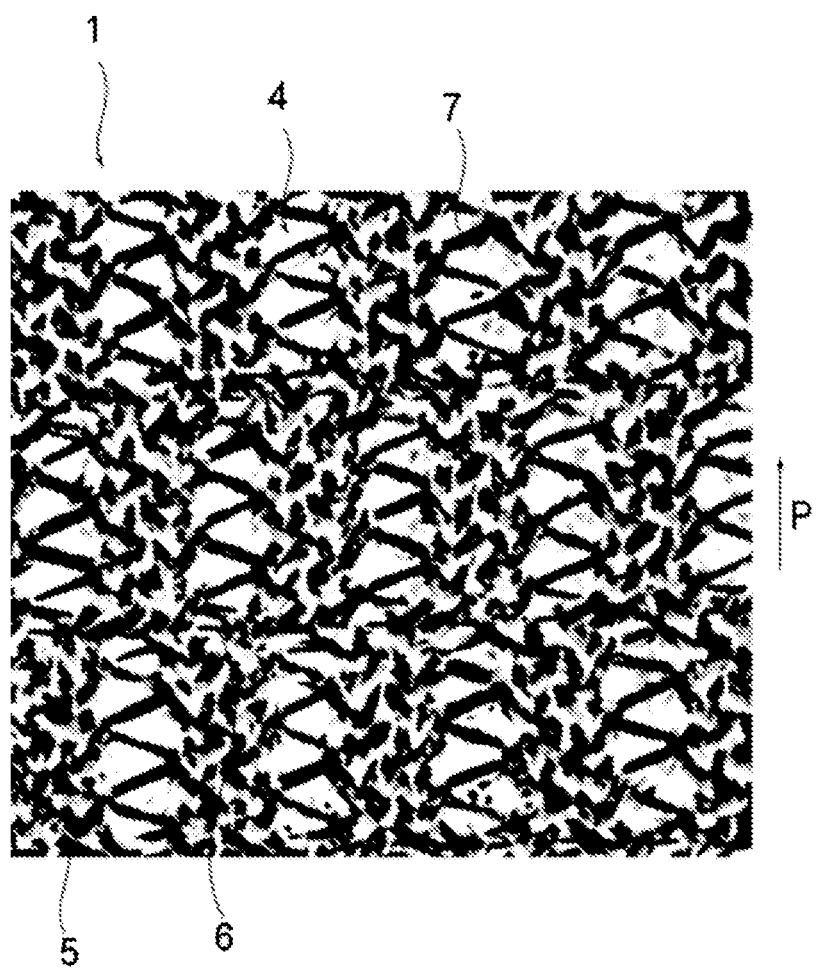
FIG. 2 a top view of the first warp-knitted fabric layer of the spacer fabric according to the invention, FIG. 3 a schematic representation of the thread systems of the first warp-knitted fabric layer.
Figure 3:
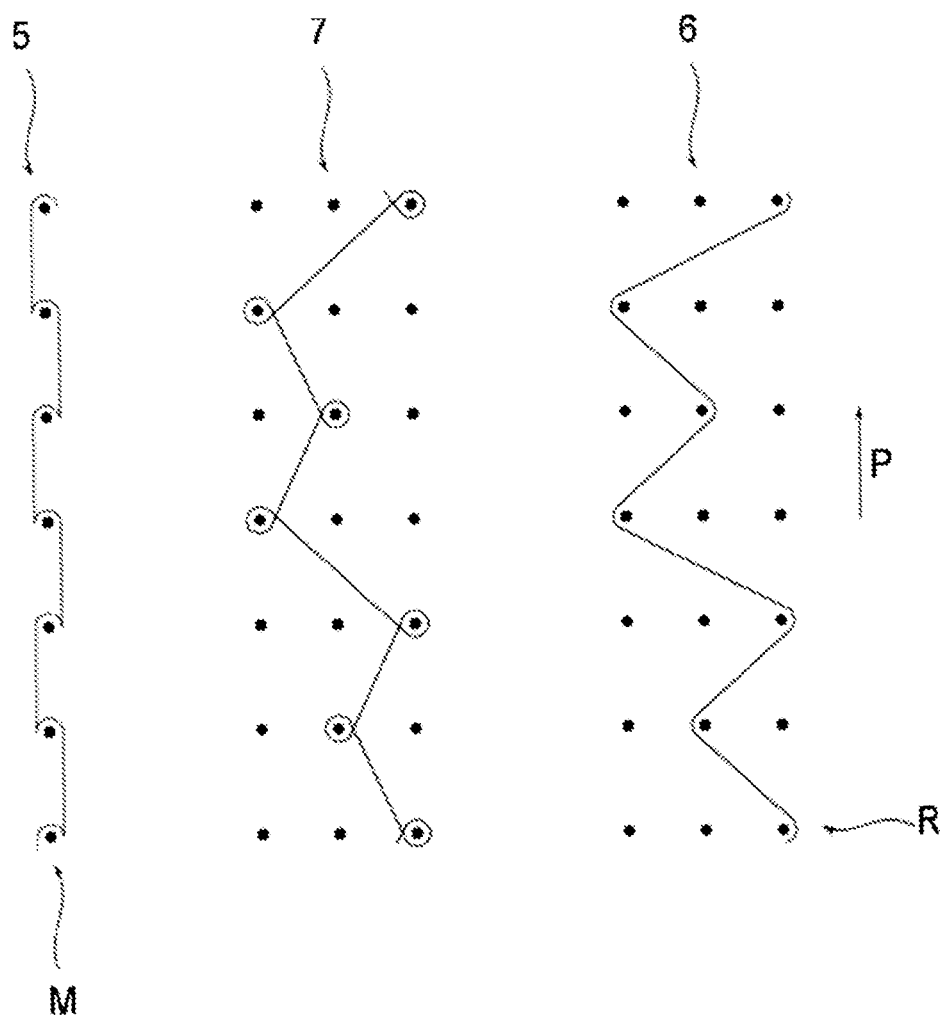

The progression of the individual thread systems 5 and 6 can be clearly seen, in particular, in a comparison with FIG. 3. Accordingly, a traditional pillar stitch construction with open pillar stitches is provided for the first thread system 5, which stitches are merely guided along a stitch wale M. The second thread system 6 runs, in total, along three stitch wales M that are adjacent to one another, wherein the thread always runs around two adjacent stitch wales M, in an alternating sequence. This has the result that the individual pillar stitches of the first thread system 5 are alternately twisted to the left and the right, in the production direction P, and that the perforated structure with the openings 4, as shown in FIG. 2, forms. The threads of the second thread system 6 then run in a zigzag shape.

The threads of the first thread system 5 have a greater fineness as compared with the second thread system 6 and also as compared with the spacer threads 3, and thereby contribute to a major portion of the material on the surface of the first textile warp-knitted fabric layer 1. In this way, the penetration of hook-and-loop hooks is made more difficult 4, and consequently the hook-and-loop closure resistance of the surface is improved.

From a comparison of FIGS. 2 and 3, it furthermore becomes clear that a third thread system 7 is also provided, which runs simultaneously to the second thread system 6, but in contrast to the latter is connected to the individual stitch wales M, in each instance, by way of loops. This is therefore an offset tricot lapping, which on the one hand contributes to the stabilization of the second thread system 6, and on the other hand covers the openings 4 to a certain degree and thereby protects them against the penetration of dirt or dust.

All the thread systems 5, 6, 7 of the first warp-knitted fabric layer 1 are furthermore formed from a polyester, in particular from polyethylene terephthalate. This holds true equally for the spacer threads 3 as well as for the second textile warp-knitted fabric layer 2.

The invention claimed is:

1. A spacer fabric having a first planar warp-knitted fabric layer (1), a second planar warp-knitted fabric layer (2), and spacer threads (3) connecting the first and second planar warp-knitted fabric layers (1, 2), wherein the first planar warp-knitted fabric layer (1) is formed from at least a first thread system and a second thread system (5, 6) and has stitch wales (M) that run in a production direction (P), as well as stitch courses (R) that run in a crosswise direction, wherein the first thread system (5) is formed as a pillar stitch construction, and the threads of the second thread system (6) are guided, without forming loops, along the production direction (P), in an alternating sequence, so that proceeding sequentially from a center stitch wale that is disposed between a left stitch wale and a right stitch wale, the threads of the second thread system (6) are alternately guided around the left stitch wale and around the right stitch wale and then around the center stitch wale and then around the right stitch wale, and wherein threads of the first thread system (5) have a greater fineness than the spacer threads (3).

2. The spacer fabric according to claim 1, wherein a ratio of the fineness of the threads of the first thread system (5) to the spacer threads (3) amounts to at least 1.5:1.

3. The spacer fabric according to claim 1, wherein the threads of the first thread system (5) have a fineness between 100 and 300 dtex.

4. The spacer fabric according to claim 1, wherein the threads of the second thread system (6) have a fineness between 15 and 100 dtex.

5. The spacer fabric according to claim 1, wherein the first thread system (5) is formed with one guide bar, and the second thread system (6) is formed with two guide bars, with one guide bar of the two guide bars of the second thread system (6) having an intake 1 full, 1 empty.

6. The spacer fabric according to claim 1, wherein the first warp-knitted fabric layer (1) has a third thread system (7), which is formed as a tricot lapping.

7. The spacer fabric according to claim 6, wherein the third thread system (7) is formed with two guide bars, with one guide bar of the two guide bars of the third thread system (7) having an intake 1 full, 1 empty.

8. The spacer fabric according to claim 6, wherein threads of the third thread system (7) are formed from a smooth yarn.

9. The spacer fabric according to claim 1, wherein the warp-knitted fabric layers (1, 2) and the spacer threads (3) consist of polyester.

10. The spacer fabric according to claim 1, wherein the spacer fabric has a hook-and-loop closure resistance of at least Grade 4 according to a hook-and-loop closure test in accordance with VDA 230-210.

11. Interior trim comprising a cover material made with the spacer fabric according to claim 1.

* * * * *